US012525339B2

(12) United States Patent
Matsuzaki et al.

(10) Patent No.: US 12,525,339 B2
(45) Date of Patent: Jan. 13, 2026

(54) MEDICAL IMAGE PROCESSING SYSTEM AND MEDICAL IMAGE PROCESSING METHOD

(71) Applicant: FUJIFILM Healthcare Corporation, Kashiwa (JP)

(72) Inventors: Kazuki Matsuzaki, Chiba (JP); Toru Shirai, Chiba (JP); Isao Takahashi, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 382 days.

(21) Appl. No.: 18/241,457

(22) Filed: Sep. 1, 2023

(65) Prior Publication Data

US 2024/0096478 A1  Mar. 21, 2024

(30) Foreign Application Priority Data

Sep. 16, 2022  (JP) .................... 2022-148493

(51) Int. Cl.
*G06K 9/00* (2022.01)
*G06T 7/00* (2017.01)
*G16H 30/40* (2018.01)

(52) U.S. Cl.
CPC .......... *G16H 30/40* (2018.01); *G06T 7/0014* (2013.01); *G06T 2207/10081* (2013.01); *G06T 2207/10088* (2013.01); *G06T 2207/10121* (2013.01)

(58) Field of Classification Search
CPC .......... G06T 2207/10121; G06T 2207/10081; G06T 2207/10088; G06T 2207/20212;
(Continued)

(56) References Cited

U.S. PATENT DOCUMENTS

2009/0118609 A1* 5/2009 Rahn ................. A61B 6/12
606/34
2017/0273614 A1* 9/2017 Giphart ............... A61B 6/5217
(Continued)

FOREIGN PATENT DOCUMENTS

JP 2008-161643 A 7/2008
WO WO2018/006168 A1 1/2018

OTHER PUBLICATIONS

European search report dated Jan. 5, 2024 in connection with European Patent Application No. 23 19 3107.
(Continued)

*Primary Examiner* — Gregory A Morse
*Assistant Examiner* — Kevin M Coomber
(74) *Attorney, Agent, or Firm* — Paul Teng (57) ABSTRACT

A high-definition guide image for supporting a procedure that uses an X-ray fluoroscopic image is generated from 3D images taken in advance by a CT device and an MRI device, and the generated image is displayed. A parameter value is acquired from the parameters set in an X-ray imaging device upon taking the fluoroscopic image. After performing registration between the 3D CT image and the 3D MRI image, using the parameter value of the X-ray imaging device, the direction of light passage of the cone beam is set on each of the 3D CT image and the 3D MRI image, and 2D projected images are generated therefrom respectively. Then, the generated 2D projected images are superimposed and the superimposed image is displayed as the guide image.

9 Claims, 9 Drawing Sheets (58) Field of Classification Search
CPC ............. A61B 6/487; A61B 2090/376; A61B 6/032; A61B 2090/374; A61B 2090/364; A61B 6/5247; A61B 6/504; A61B 90/37; A61B 34/20; A61B 5/066; A61B 6/027; G01R 33/4812; G01R 33/5608
See application file for complete search history.

(56) References Cited

U.S. PATENT DOCUMENTS

2019/0304129 A1* 10/2019 Schafer .................. G06T 7/174
2019/0350658 A1* 11/2019 Yang ...................... A61B 34/20

OTHER PUBLICATIONS

Carlson, J.D., "Stereotactic registration using cone-beam computed tomography", Clin Neurol Neurosurg, vol. 182, pp. 107-111 (2019).

* cited by examiner

IMAGE ONLY

FIG. 3B

CONE BEAM
(USE OF X-RAY IMAGING DEVICE PARAMETER)

PARALLEL BEAM

FIG. 4A GUIDE IMAGE (CONE BEAM)
(USE OF X-RAY IMAGING DEVICE PARAMETER)

FIG. 4B FLUOROSCOPIC IMAGE BY X-RAY IMAGING DEVICE DURING PROCEDURE (BEFORE INJECTION OF CONTRAST)

FIG. 4C FLUOROSCOPIC IMAGE BY X-RAY IMAGING DEVICE DURING PROCEDURE (AFTER INJECTION OF CONTRAST)

FIG. 4D COMPARATIVE IMAGE (PARALLEL BEAM)

FIG. 6A
CONE BEAM
(USE OF X-RAY IMAGING DEVICE PARAMETER)

FIG. 6B
PARALLEL BEAM

FIG. 8A GUIDE IMAGE (CONE BEAM) (USE OF X-RAY IMAGING DEVICE PARAMETER)

FIG. 8B FLUOROSCOPIC IMAGE BY X-RAY IMAGING DEVICE DURING PROCEDURE (BEFORE INJECTION OF CONTRAST)

FIG. 8D COMPARATIVE IMAGE (PARALLEL BEAM)

FIG. 8E RADIAL PATTERN + GUIDE IMAGE (CONE BEAM)

FIG. 8F DOT-LIKE PATTERN + COMPARATIVE IMAGE (PARALLEL BEAM)

FIG. 8C FLUOROSCOPIC IMAGE BY X-RAY IMAGING DEVICE DURING PROCEDURE (AFTER INJECTION OF CONTRAST)

MEDICAL IMAGE PROCESSING SYSTEM AND MEDICAL IMAGE PROCESSING METHOD

BACKGROUND OF THE INVENTION

Technical Field

The present invention relates to a technique to generate a guide image of a subject from a previously imaged 3D image, with respect to a fluoroscopic image of the same subject imaged by an X-ray imaging device for a procedure such as a catheterization.

Description of the Related Art

There is performed a procedure to insert a wire or a similar tool, into a tubular structure such as a blood vessel and a bile duct of a patient while taking a fluoroscopic image of the patient by an X-ray imaging device and displaying the image. In this kind of situation, there is known a 3D roadmap technique that displays the fluoroscopic image taken in real time, together with a 3D mask image acquired by rotating an X-ray source immediately before (see Japanese Unexamined Patent Application Publication No. 2008-161643, hereinafter referred to as Patent Literature 1). Displaying an image of a blood vessel in the form of the 3D mask image can support insertion of a wire or a similar tool into the blood vessel.

In the 3D roadmap technique, the 3D mask image is taken immediately before the procedure, thereby eliminating the need for registration (alignment) between 3D mask image and the fluoroscopic image taken in real time. However, imaging the 3D mask image immediately before the procedure is burdensome to the patient because this increases an exposure dose or a contrast agent dose for the patient.

In order to solve this problem, Patent Literature 1 suggests a technique that provides setup conditions used for taking a previously-acquired 3D mask image, to the X-ray imaging device to take a real-time fluoroscopic image, and also corrects a misregistration between the fluoroscopic image and the 3D mask image, according to a result of subtraction between the fluoroscopic image and 3D mask image.

SUMMARY OF THE INVENTION

Technical Problem

The roadmap technique disclosed in Patent Literature 1 assumes that the previously-acquired 3D mask image is taken by rotating the X-ray source of the X-ray imaging device. The previously-acquired 3D mask image is taken by the X-ray imaging device, thereby allowing the setup conditions upon taking the fluoroscopic image in real time to agree with those upon taking the 3D mask image. In addition, only by aligning the 3D mask image with the fluoroscopic image, a good agreement between them can be achieved.

In the meantime, as a method of acquiring a 3D image, there are known methods that use a CT device or an MRI (magnetic resonance imaging) device in addition to the method of using the X-ray imaging device. The CT device can take a 3D image that can display a patient's skeletal structure and similar structures, in higher definition than the X-ray imaging device. The MRI device can take a 3D image where images of tubular structures such as a bile duct and a blood vessel are extracted and displayed in high definition without using a contrast agent.

The X-ray imaging device, however, irradiates the patient with X-rays from an X-ray source which is a point light source, and projects the X-rays transmitted through the patient onto a flat X-ray detector for imaging. Therefore, the X-ray imaging device has a characteristic that the tissue in proximity to the body surface of the patient close to the X-ray source and the tissue in the region close to the X-ray detector far from the X-ray source have different magnifications on the fluoroscopic image. On the other hand, imaging principles for taking 3D images by the CT device and the MRI device are different from those of the X-ray imaging device, and the images are generated by performing 3D image reconstruction process. Thus, the projected image does not coincide with the fluoroscopic image of the X-ray imaging device when they are projected on a two-dimensional plane. Therefore, when a mask image is generated from the 3D image taken by the CT device or the MRI device, the positions of the patient tissues on the mask image do not coincide with the positions on the fluoroscopic image, and the mask image is not suitable for supporting the insertion of the wire into the patient.

An object of the present invention is to generate a high-definition guide image for supporting the procedure that is performed using the X-ray fluoroscopic image, from the 3D image previously taken by the CT device or the MRI device, and display the generated image.

Solution to Problem

In order to achieve the above object, the present invention provides a medical image processing system that generates a subject image serving as a guide image, for a procedure performed on a subject while viewing a fluoroscopic image taken by an X-ray imaging device. The medical image processing system comprises a three-dimensional image acquisition unit, an image registration unit, a tissue structure extraction unit, a parameter acquisition unit, a projection calculation unit, and an image superimposition unit. The three-dimensional image acquisition unit receives a three-dimensional CT image of the subject taken in advance by a CT device, and a three-dimensional MRI image of the subject taken in advance by a magnetic resonance imaging device. The image registration unit performs registration between the three-dimensional CT image and the three-dimensional MRI image. The tissue structure extraction unit generates a three-dimensional MRI specific-tissue image by extracting a predetermined specific tissue image from the registered three-dimensional MRI image. The parameter acquisition unit acquires a value of predetermined type of parameter among multiple types of parameters set in the X-ray imaging device upon taking the fluoroscopic image. The projection calculation unit uses the parameter value acquired by the parameter acquisition unit to set a direction of light passage corresponding to a direction in which the X-ray passes through the subject in the X-ray imaging device, to each of the three-dimensional CT image and the three-dimensional MRI specific-tissue image, and projects the three-dimensional CT image and the three-dimensional MRI specific-tissue image along the direction of light passage, respectively, to generate two-dimensional projected images. The image superimposition unit generates a superimposed image in which the two-dimensional projected image of the three-dimensional CT image and the two-dimensional projected image of the three-dimensional MRI specific-tissue image are superimposed, and displays the generated superimposed image as the guide image.

According to the present invention, it is possible to generate and display a high-definition guide image for supporting a procedure performed using an X-ray fluoroscopic image from the 3D image previously taken by the CT device or an MRI device.

DETAILED DESCRIPTION OF THE PREFERRED EMBODIMENTS

There will now be described a medical image processing system according to embodiments of the present invention with reference to the accompanying drawings.

Figure 1:
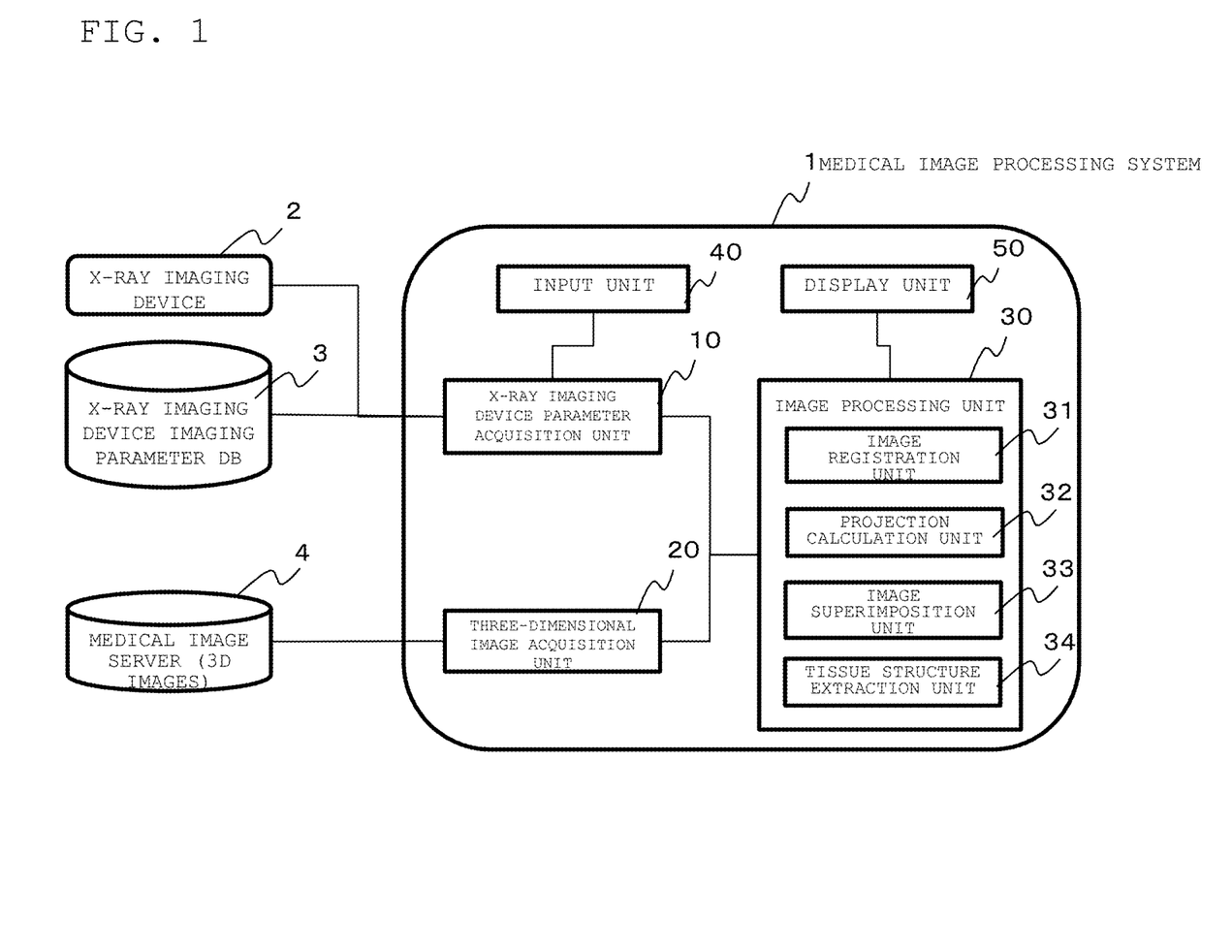
FIG. 1 is a block diagram showing a configuration of a medical image processing system according to a first embodiment.
Figure 2:
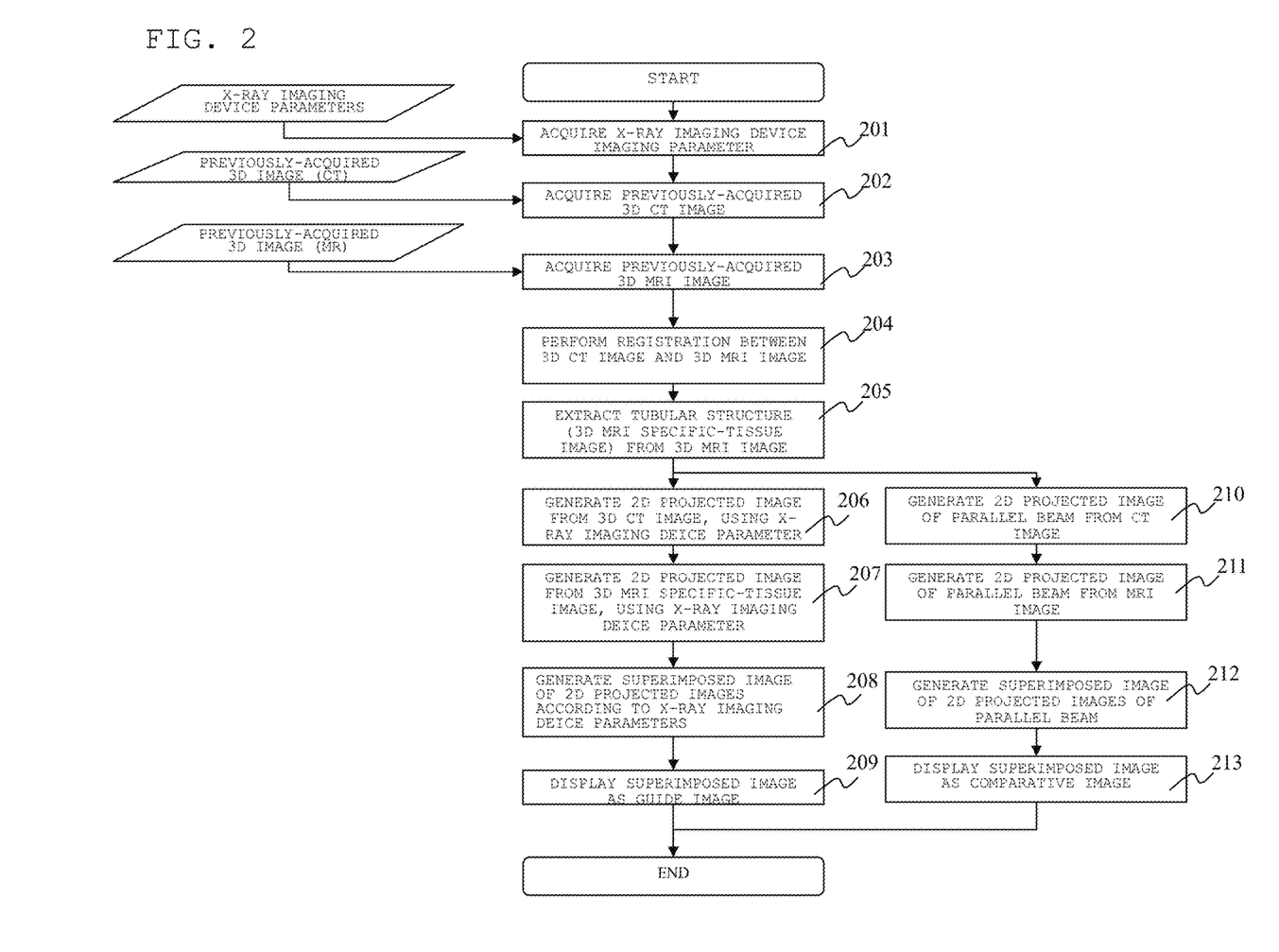
FIG. 2 is a flowchart showing the operation of the medical image processing system according to the first embodiment.
Figure 3A:
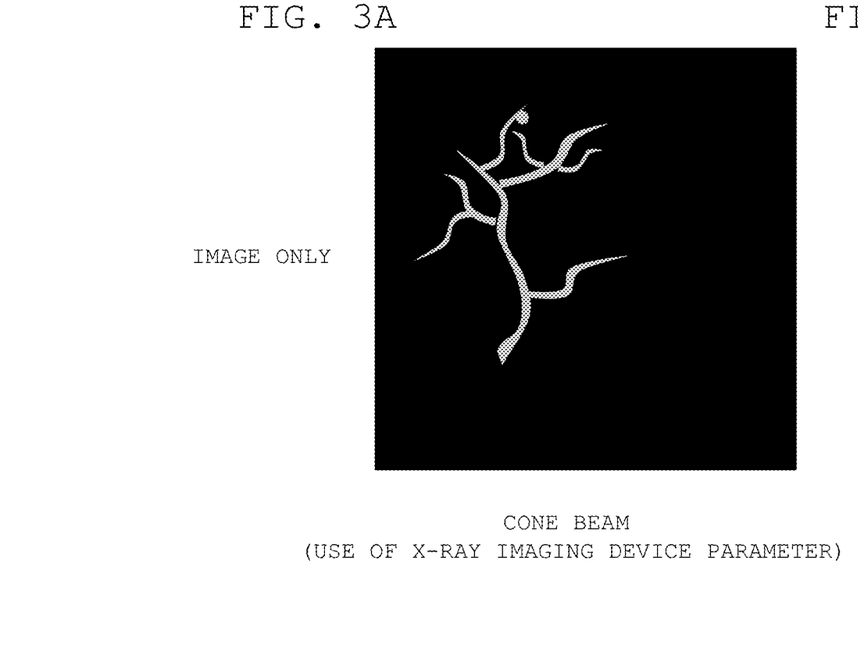
FIG. 3A illustrates a two-dimensional projected image obtained by projecting a specific tissue (blood vessel) of a three-dimensional MRI image along a direction of light passage of a cone beam in the medical image processing system 1 according to the first embodiment.
Figure 3B:
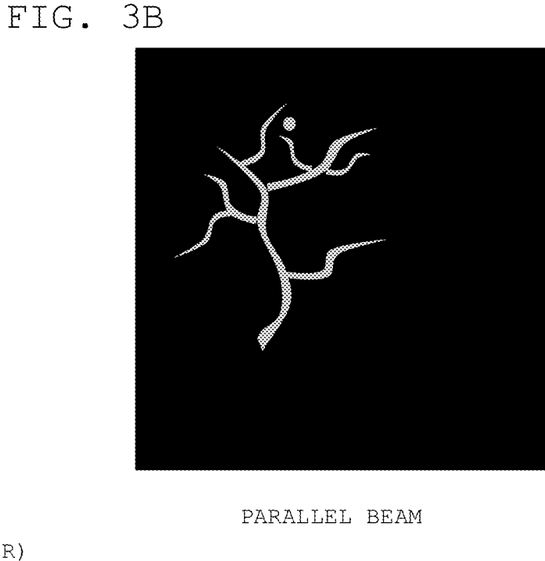
FIG. 3B illustrates a two-dimensional projected image obtained by projecting the specific tissue (blood vessel) of the three-dimensional MRI image along the direction of light passage of a parallel beam in the medical image processing system 1 according to the first embodiment.

FIG. 1 illustrates a configuration of the medical image processing system 1. FIG. 2 is a flowchart showing the operation of the medical image processing system 1. FIGS. 3 and 4 illustrate examples of a display screen.

The medical image processing system 1 is a device that generates a subject image serving as a guide image, displayed with a fluoroscopic image, side by side for example, when a user, e.g., a doctor, performs a procedure, such as inserting a catheter into the subject while viewing the fluoroscopic image taken by an X-ray imaging device. The guide image is used for allowing the doctor to accurately grasp a structure of the subject and a position and a shape of a specific tissue (for example, a tubular structure such as a bile duct, a blood vessel, and an intestinal tract).

The tissue of the subject is projected onto the fluoroscopic image taken by the X-ray imaging device at a different magnification, depending on the distance from the X-ray source, the distance from the X-ray detection panel, and the angle between the trajectory of the X-ray passing through the tissue and the optical axis of the X-ray source. Therefore, the positional relationship and the size of the tissue of the subject on the fluoroscopic image become peculiar to the fluoroscopic image. In the present embodiment, considering the characteristics of the image taken by the X-ray imaging device, the guide image (subject image) is generated in such a manner that the magnification and positional relationship of the tissue are the same as those of the fluoroscopic image. This allows the doctor to refer to the guide image that looks the same way as the fluoroscopic image, thereby grasping the structure of the subject and the specific tissue. With this configuration, the medical image processing system 1 can support the procedure performed by the doctor such as insertion of a catheter.

The medical image processing system 1 can generate the guide image (subject image) in real time and display the guide image (subject image) side by side with the fluoroscopic image taken at that time, in the middle of performing the procedure by the doctor.

In addition, in order to allow the doctor to accurately grasp the structure of the subject, and the positional relationship and the shape of the tissue, or to simulate the procedure, prior to performing actual procedure, the medical image processing system 1 can also be used in the state separated from the X-ray imaging device.

(Structure of Medical Image Processing System 1)

As illustrated in FIG. 1, the medical image processing system 1 includes a three-dimensional image acquisition unit 20, an X-ray imaging device parameter acquisition unit 10, an image processing unit 30, an input unit 40, and a display unit 50. The image processing unit 30 includes an image registration unit 31, a projection calculation unit 32, an image superimposition unit 33, and a tissue structure extraction unit 34.

The three-dimensional image acquisition unit 20 receives a three-dimensional CT image of a subject previously taken by a CT device and a three-dimensional MRI image of the subject previously taken by a magnetic resonance imaging (MRI) device. Any method may be possible to receive the images, and FIG. 1 shows a configuration as an example that the three-dimensional image acquisition unit 20 is connected to a medical image server 4 to capture the three-dimensional CT image and the three-dimensional MRI image from the images that are taken by devices such as the CT device and the MRI device and stored in advance in the medical image server 4. In addition, the three-dimensional image acquisition unit 20 may also be configured to receive the three-dimensional CT image and the three-dimensional MRI image from the doctor via the input unit 40.

Since the three-dimensional CT image has pixel values associated with X-ray absorption coefficients of the tissues constituting the subject, the pixel value of the tissue having a large X-ray absorption coefficient tends to be large (white pixel), for example, a skeletal structure of the subject. On the other hand, as the three-dimensional MRI image, the selected image is taken according to a method that allows the tissue targeted for the procedure to be represented as a high signal. For example, when the tissue targeted for the procedure is a bile duct, an image to be used is taken by MRCP (Magnetic Resonance Cholangio Pancreatography), being a vascular imaging method that does not use contrast agents.

The X-ray imaging device parameter acquisition unit 10 acquires a value of predetermined type of parameter among multiple types of parameters set in the X-ray imaging device, in order to take a fluoroscopic image of the subject during the procedure.

The parameters for acquiring the values by the X-ray imaging device parameter acquisition unit 10 include a distance (SID: Source to Image receptor Distance) between the X-ray source and the X-ray detection panel when the X-ray imaging device takes the fluoroscopic image, and a size of the X-ray detection panel. When the X-ray source can be rotated (tilted), it is preferable to acquire a distance between the X-ray source and the rotation axis (SAD: Source-Axis Distance). It is further preferable to also acquire the size of each detector constituting the X-ray detection panel.

The X-ray imaging device parameter acquisition unit 10 may be configured to acquire the parameter values from the connected X-ray imaging device or an X-ray imaging device imaging parameter database 3, or it may receive the values of the parameters from the doctor via the input unit 40. The X-ray imaging device imaging parameter database 3 stores in advance the parameters suitable for taking fluoroscopic images, for each type of procedure, each target site, and each gender and age of the subject.

The image registration unit 31 performs registration between the three-dimensional CT image and the three-dimensional MRI image acquired by the three-dimensional image acquisition unit 20. Any desirable method may be employed for the registration, such as a publicly known registration method using pixel values or a publicly known registration method using distinctions as landmarks.

The tissue structure extraction unit 34 extracts an image of a specific tissue (for example, a blood vessel) determined in advance, from the three-dimensional MRI image after the image registration unit 31 performs registration, and generates a three-dimensional MRI specific-tissue image. As the extraction method, a publicly known method such as a clipping method can be employed.

Figure 5A:
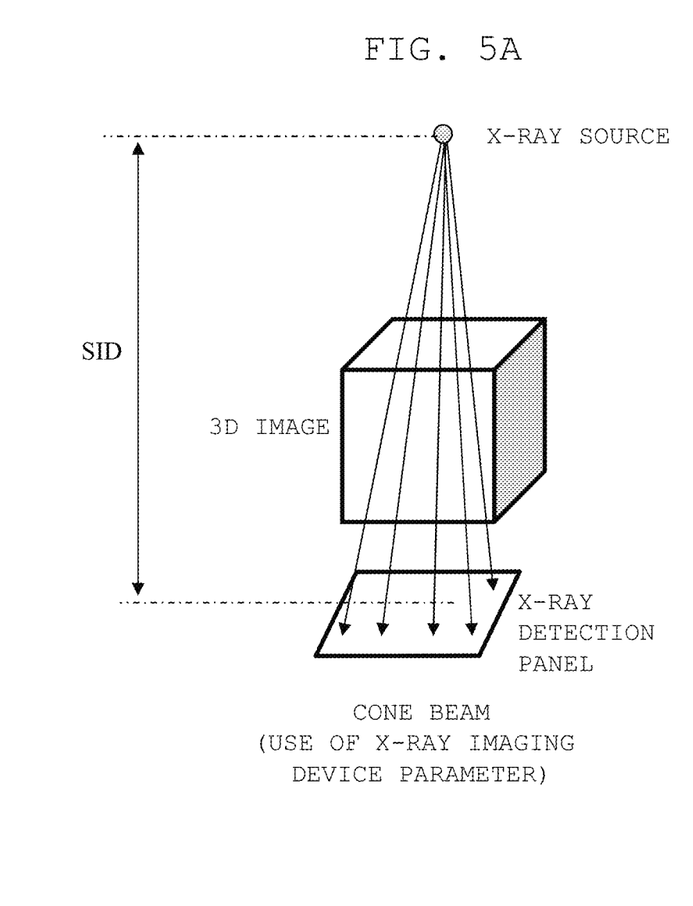
FIG. 5A illustrates the direction of light passage of the cone beam set in the medical image processing system 1 according to the first embodiment.

The projection calculation unit 32 uses the parameter values acquired by the X-ray imaging device parameter acquisition unit 10 to set the direction of light passage (rays) associated with the direction of the X-rays passing through the subject in the X-ray imaging device, to each of the three-dimensional CT image and the three-dimensional MRI specific-tissue image (see FIG. 5A). That is, the direction of light passage that is the same as the direction of the cone beam X-rays passing through the subject, reaching the entire X-ray detection panel from the X-ray source serving as a point light source, is set on each of the three-dimensional CT image and the three-dimensional MRI specific-tissue image.

The projection calculation unit 32 projects each of the three-dimensional CT image and the three-dimensional MRI specific-tissue image along the set direction of the cone beam light passage, and generates two-dimensional projected images. For generating the two-dimensional projected images, the projection calculation unit 32 uses methods such as RaySum (Ray Summation: a sum-total of pixel values) and maximum intensity projection (MIP).

The two-dimensional projected images are images projected onto the projection surface at a different magnification depending on the settings, including the distance from the center (X-ray source) of the direction of light passage, the distance from the projection surface (X-ray detection panel), and the angle between the light passing through the tissue and the optical axis (optical axis of the X-ray source).

Figure 5B:
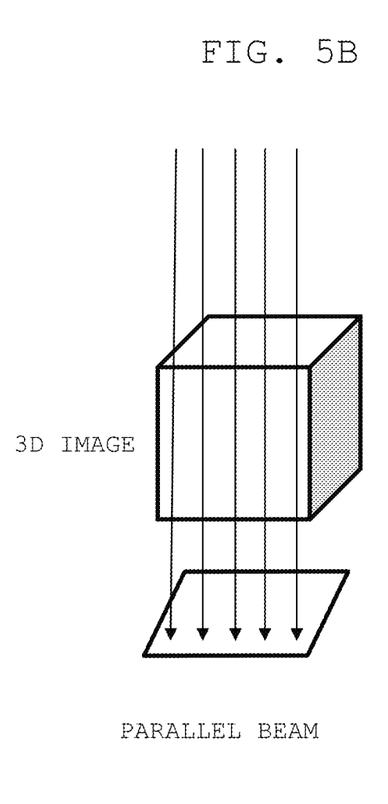
FIG. 5B illustrates the direction of light passage of the parallel beam set in the medical image processing system 1 according to the first embodiment.

For example, in the two-dimensional projected image (see FIG. 3A) obtained by the projection calculation unit 32 that projects the three-dimensional MRI specific-tissue image in the direction of light passage of the cone beam, the tissue closer to the X-ray source has a larger magnification, and it is projected at a position displaced toward the peripheral edge of the X-ray panel, as compared with the two-dimensional projected image (comparative image) (see FIG. 3B) obtained by the projection with setting the direction of light passage like a parallel beam as shown in FIG. 5B. Thus, the projection calculation unit 32 can generate the two-dimensional projected image in which the positional relationship and the size of the tissue (for example, a bile duct in FIG. 3A and FIG. 3B) of the subject are similar to the fluoroscopic image taken by the X-ray imaging device.

The two-dimensional projected image of the three-dimensional CT image generated by the projection calculation unit 32 is an image showing a structure of the subject such as bones and a body contour. On the other hand, the two-dimensional projected image of the three-dimensional MRI image is an image showing morphological information of soft tissue such as a tissue targeted for the procedure (for example, a tubular structure such as the bile duct or a blood vessel).

Figure 4A:
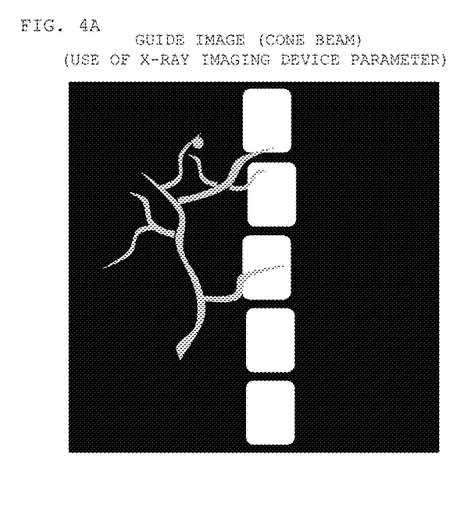
FIG. 4A illustrates a guide image generated in the medical image processing system 1 according to the first embodiment.
Figure 4B:
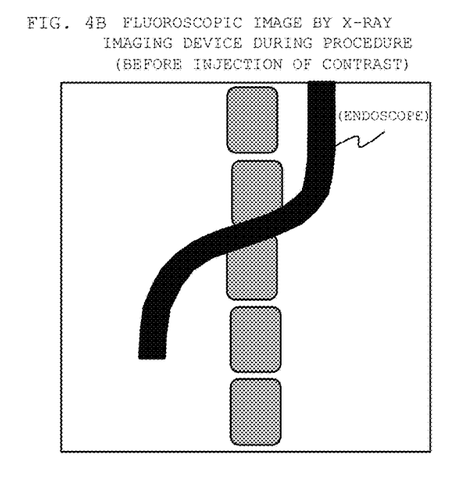
FIG. 4B illustrates a fluoroscopic image (before injection of contrast) of an X-ray imaging device during a procedure.

The image superimposition unit 33 generates a superimposed image in which the two-dimensional projected image of the three-dimensional CT image and the two-dimensional projected image of the three-dimensional MRI specific-tissue image are superimposed, allowing the displaying unit 50 to display the generated superimposed image as a guide image (see FIG. 4A).

Figure 4C:
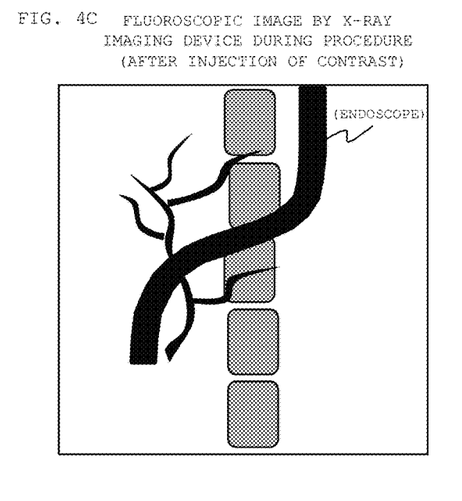
FIG. 4C illustrates the fluoroscopic image (after injection of contrast) of the X-ray imaging device during the procedure.

The medical image processing system 1 can display the fluoroscopic images (FIGS. 4B and 4C) taken by the X-ray imaging device, and the generated guide image (FIG. 4A) side by side on the display unit 50 during the procedure. FIG. 4C is the fluoroscopic image after injection of a contrast agent.

With this configuration, the doctor can refer to the fluoroscopic image taken by the X-ray imaging device and the high-definition guide image (FIG. 4A) having the same magnification ratio and positional relationship of the tissue, thereby allowing the doctor to grasp the shape and positional relationship of the soft tissue of the tubular structure such as the bile duct and the blood vessel of the subject, the skeletal structure, and others, even before injecting the contrast agent.

It is also possible that the projection calculation unit 32 generates the two-dimensional projected image of the three-dimensional CT image and the two-dimensional projected image of the three-dimensional MRI specific-tissue image (FIG. 3B), projected by the parallel beam, and displays the image (FIG. 4D) superimposed by the image superimposition unit 33 as the comparative image on the display unit 50, side by side with the two-dimensional projected image (FIG. 4A) projected in the direction of light passage of the cone beam.

The two-dimensional projected image by the cone beam (FIG. 4A) and the two-dimensional projected image by the parallel beam (FIG. 4D) are displayed side by side, thereby allowing the doctor to understand the influence of the magnification due to the cone beam (i.e., the magnification increases closer to the X-ray source, and there are displacements of the image from the optical axis toward the peripheral portion).

A CPU (Central Processing Unit), a memory, and a storage device can constitute the three-dimensional image acquisition unit 20, the X-ray imaging device parameter acquisition unit 10, and the image processing unit 30 of the medical image processing system 1. Programs and data necessary for executing the programs stored in advance in the storage device are loaded into the memory and executed, thereby allowing software to implement the functions of the three-dimensional image acquisition unit 20, the X-ray imaging device parameter acquisition unit 10, and the image processing unit 30. Some or all of the functions of the three-dimensional image acquisition unit 20, the X-ray imaging device parameter acquisition unit 10, and the image processing unit 30 may also be implemented by hardware. For example, a custom IC such as ASIC (Application Specific Integrated Circuit) or a programmable IC such as FPGA (Field-Programmable Gate Array) may be used for circuit design to implement each of the functions of the units 10, 20, and 30.

(Operation of Medical Image Processing System 1)

The operation of each unit of the medical image processing system 1 will be described with reference to the flowchart of FIG. 2.

(Step 201)

The X-ray imaging device parameter acquisition unit 10 acquires values of parameters such as the distance (SID) between the X-ray source and the X-ray detection panel and the size of the X-ray detector, the parameter values being set in the X-ray imaging device when the procedure is performed, from the connected X-ray imaging device or from the doctor via the input unit 40.

(Step 202)

The three-dimensional image acquisition unit 20 acquires, for example, from the medical image server 4, a three-dimensional CT image taken in advance on the subject targeted for the procedure.

(Step 203)

The three-dimensional image acquisition unit 20 acquires, for example, from the medical image server 4, a three-dimensional MRI image taken in advance on the subject targeted for the procedure.

(Step 204)

The image registration unit 31 performs registration between the three-dimensional CT image acquired in step 202 and the three-dimensional MRI image acquired in step 203.

(Step 205)

The tissue structure extraction unit 34 extracts an image of a predetermined specific tissue (for example, a bile duct) from the three-dimensional MRI image after the registration in step 204, and generates a three-dimensional MRI specific-tissue image.

(Step 206)

The projection calculation unit 32 uses values of the parameters acquired in step 201 to set the direction of light passage (rays) of the cone beam to the three-dimensional CT image, and then generates a two-dimensional projected image.

(Step 207)

The projection calculation unit 32 uses the values of the parameters acquired in step 201 to set the direction of light passage (rays) of the cone beam to the three-dimensional MRI specific-tissue image, and then generates a two-dimensional projected image.

(Step 208)

The image superimposition unit 33 superimposes the two-dimensional projected images; i.e., the two-dimensional projected image of the three-dimensional CT image generated in step 206 and the two-dimensional projected image of the three-dimensional MRI specific-tissue image generated in step 207, and then generates a superimposed image.

(Step 209)

The image superimposition unit 33 allows the display unit 50 to display the superimposed image generated in step 208 as a guide image (see FIG. 4A).

(Step 210)

The projection calculation unit 32 uses the values of parameters acquired in step 201 to set the direction of light passage (rays) of the parallel beam to the three-dimensional CT image, and generates a two-dimensional projected image.

(Step 211)

The projection calculation unit 32 uses the values of parameters acquired in step 201 to set the direction of light passage (rays) of the parallel beam to the three-dimensional MRI specific-tissue image, and generates a two-dimensional projected image.

(Step 212)

The image superimposition unit 33 superimposes the two-dimensional projected images; i.e., the two-dimensional projected image of the three-dimensional CT image generated in step 210 and the two-dimensional projected image of the three-dimensional MRI specific-tissue image generated in step 211, and generates a superimposed image.

(Step 209)

Figure 4D:
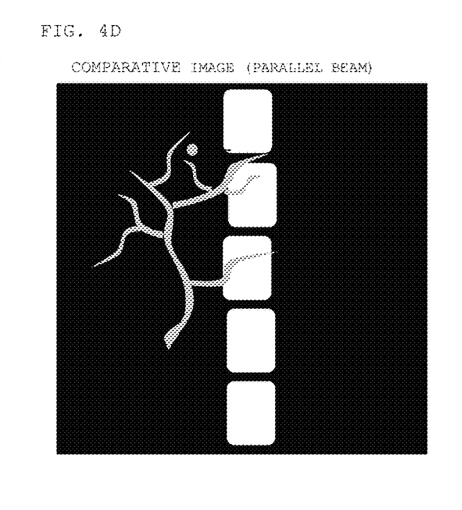
FIG. 4D illustrates a comparative image generated in the medical image processing system 1 according to the first embodiment.

The image superimposition unit 33 displays the superimposed image thus generated as a comparative image on the display unit 50, side by side with the guide image (see FIG. 4D).

The doctor can refer to the fluoroscopic image taken by the X-ray imaging device and the high-definition guide image (FIG. 4A) in which the magnification and the positional relationship of the tissue are the same as the fluoroscopic image, and grasp the shape and positional relationship of the soft tissue such as the blood vessel structure, and the skeletal structure of the subject.

Displaying the guide image based on the cone beam (FIG. 4A) and the comparative image based on the parallel beam (FIG. 4D) side by side enables the doctor to understand the influence of the magnification due to the cone beam.

Furthermore, during the procedure, the medical image processing system 1 may capture the fluoroscopic image (FIG. 4B or FIG. 4C) from the X-ray imaging device 2, and display the captured image side by side with the guide image (FIG. 4A) and the comparative image (FIG. 4D).

The guide image (FIG. 4A) displayed in the present embodiment has the same magnification and positional relationship of the tissue as those of the fluoroscopic image of the X-ray imaging device, and in addition, the guide image is the superimposed image of the two-dimensional projected images respectively generated from the three-dimensional CT image and the three-dimensional MRI image. Thus this superimposed image represents the skeletal structure and outlines of the subject, together with the tissue such as the blood vessel at high definition, and this allows the doctor to compare between the fluoroscopic image and the guide image (FIG. 4A) with a high degree of accuracy.

Second Embodiment

There will be described the medical image processing system according to the second embodiment.

The medical image processing system of the second embodiment has the same configuration as that of the medical image processing system 1 of the first embodiment. As shown in FIG. 4A, the system sets the direction of light passage (rays) of the cone beam to each of the three-dimensional CT image and the three-dimensional MRI specific-tissue image, generates two-dimensional projected images respectively, and then generates the guide image by superimposing those two-dimensional projected images (FIG. 4A).

Figure 6A:
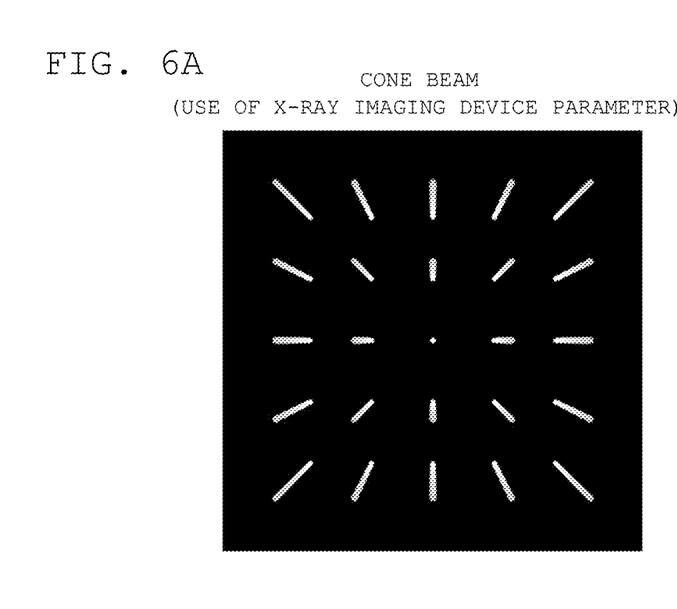
FIG. 6A illustrates a radial pattern generated in the medical image processing system according to a second embodiment.
Figure 6B:
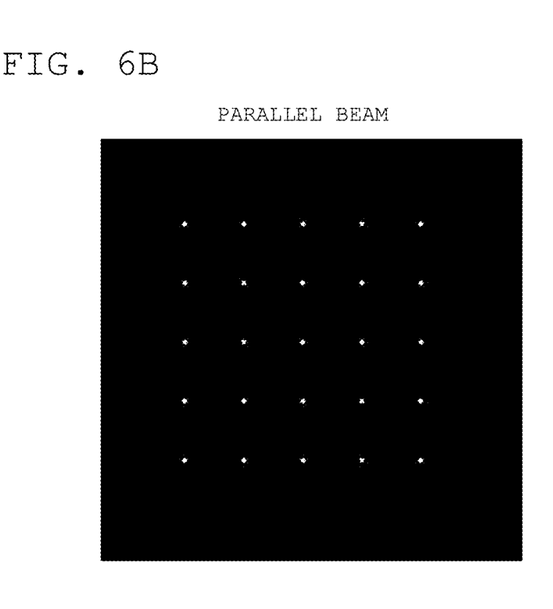
FIG. 6B illustrates a dot-like pattern generated in the medical image processing system according to the second embodiment.

Furthermore, the medical image processing apparatus of the second embodiment generates a radial pattern as shown in FIG. 6A so that the doctor can visually grasp that in the guide image (FIG. 4A) of the first embodiment, there are displacements of the image from the optical axis toward the peripheral edge portion as the tissue is positioned farther from the optical axis of the X-ray source.

Figure 7A:
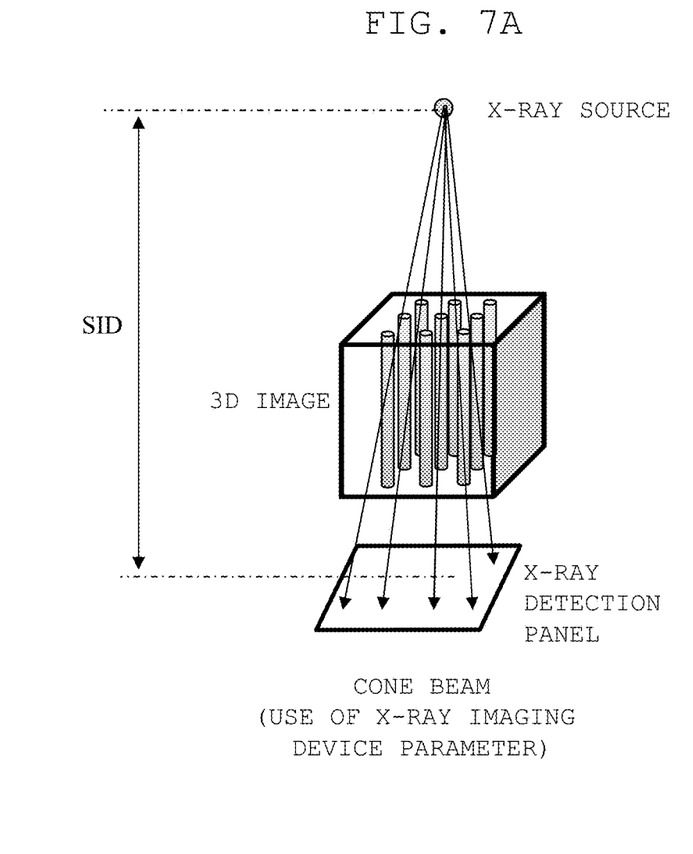
FIG. 7A illustrates a state that the direction of light passage of the cone beam is set in multiple tubular structures in parallel to the optical axis of an X-ray source in order to generate the radial pattern in the medical image processing system according to the second embodiment.

Specifically, as shown in FIG. 7A, the projection calculation unit 32 performs processing to set the cone beam-like direction of light passage that is the same as the direction set in steps 206 and 207, to the three-dimensional image with multiple tubular structures arranged in parallel to the optical axis of the X-ray source, and to project the three-dimensional image onto a two-dimensional plane, thereby generating a radial pattern. This process is performed after step 207. The cone beam-like direction of light passage is set in steps 206 and 207 using the values of the X-ray device imaging parameters acquired in step 201 of FIG. 2. As shown in FIG. 6A, as the tissue is farther from the optical axis of the X-ray source, the lines of the pattern are longer, and thus the generated radial pattern allows a viewer to intuitively get an idea that there are displacements of the image from the optical axis toward the peripheral portion.

Figure 8A:
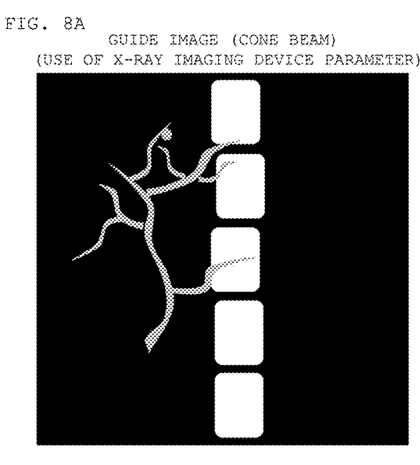
FIG. 8A illustrates the guide image generated in the medical image processing system according to the second embodiment.
Figure 8B:
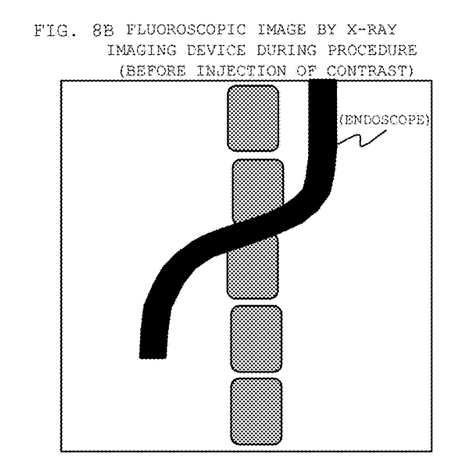
FIG. 8B illustrates the fluoroscopic image (before injection of contrast) of the X-ray imaging device during the procedure.
Figure 8C:
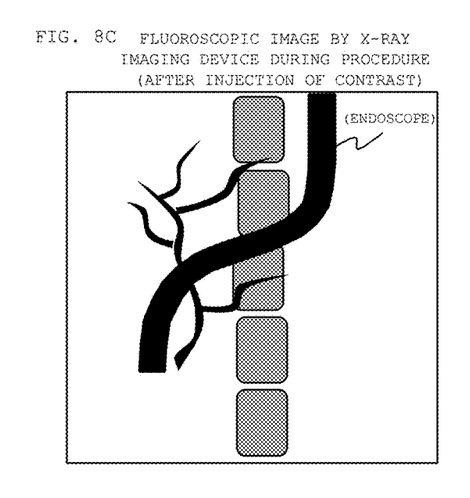
FIG. 8C illustrates the fluoroscopic image (after injection of contrast) of the X-ray imaging device during the procedure.
Figure 8D:
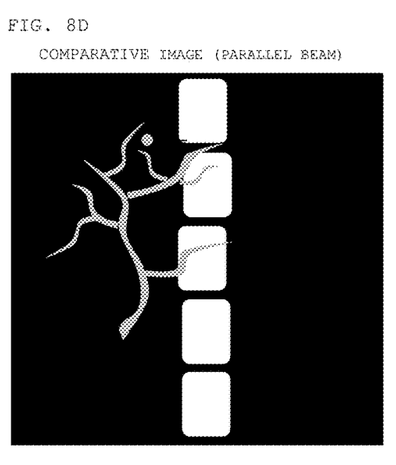
FIG. 8D illustrates the comparative image generated in the medical image processing system according to the second embodiment.
Figure 8E:
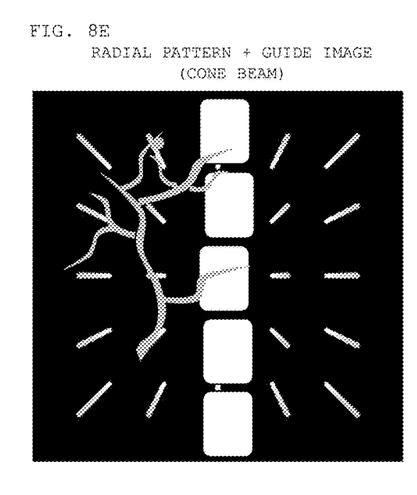
FIG. 8E illustrates the guide image with the superimposed radial pattern, generated in the medical image processing system according to the second embodiment.

As shown in FIG. 8E, the image superimposition unit 33 superimposes thus generated radial pattern on the guide image (FIG. 8D), and displays the guide image on the display unit 50. This allows the doctor to recognize the amount of displacement and the direction of displacement of the tissue occurring on the guide image.

Figure 7B:
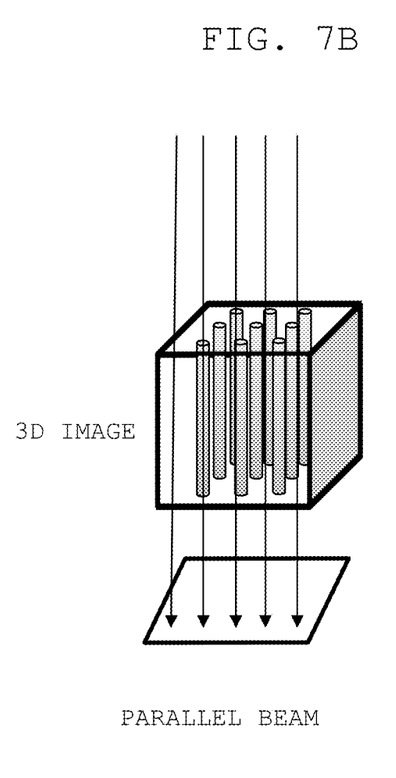
FIG. 7B illustrates a state that the direction of light passage of the parallel beam is set in multiple tubular structures in parallel to the optical axis of the X-ray source in order to generate the dot-like pattern in the medical image processing system according to the second embodiment.

Similarly, as shown in FIG. 7B, it is also possible that the projection calculation unit 32 sets the parallel beam-like direction of light passage that is the same as the direction set in steps 210 and 211, to the three-dimensional image with multiple tubular structures arranged in parallel to the optical axis of the X-ray source, and projects the three-dimensional image onto a two-dimensional plane, thereby generating a dot-like pattern.

The dot-like pattern allows the viewer to intuitively get an idea that the projected image of the parallel beam onto the two-dimensional plane does not cause displacements of the image even though the tissue is away from the optical axis of the X-ray source.

Figure 8F:
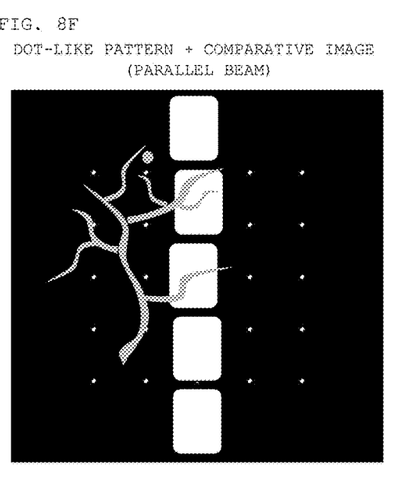
FIG. 8F illustrates the comparative image with the superimposed dot-like pattern, generated in the medical image processing system according to the second embodiment.

As shown in FIG. 8F, the image superimposition unit 33 superimposes the generated dot-like pattern on the comparative image (FIG. 8D), and displays the superimposed image on the display unit 50. Then, the doctor can recognize that there is no displacement of the tissue in the comparative image.

Further, as shown in FIGS. 8A, 8B, 8C, and 8D, the images are displayed together on the display unit 50; the guide image (FIG. 8A) and the comparative image (FIG. 8D) without the superimposed patterns, and the fluoroscopic images of the X-ray imaging device (FIGS. 8B and 8C), whereby the doctor can intuitively grasp the structure and position of the specific tissue (blood vessel).

It is further possible that the radial pattern and the dot-like pattern may be generated in advance and stored in the storage device, and the image superimposition unit 33 reads out the radial pattern and the dot-like pattern from the storage device, and superimposes the radial pattern and the dot-like pattern, respectively, on the guide image (FIG. 8A) and on the comparative image (FIG. 8D). In this case, it is preferable that the radial pattern is generated in advance for each combination of the parameter values (SID and the size of the X-ray detector) that can be set in the X-ray imaging device, and stored in the storage device. It may also be configured to store only some typical patterns and select a pattern that is associate with a similar combination of the parameter values.

Other configurations, operations, and effects of the medical image processing system according to the second embodiment are the same as those of the first embodiment, and thus descriptions thereof will not be given.

Third Embodiment

Figure 9:
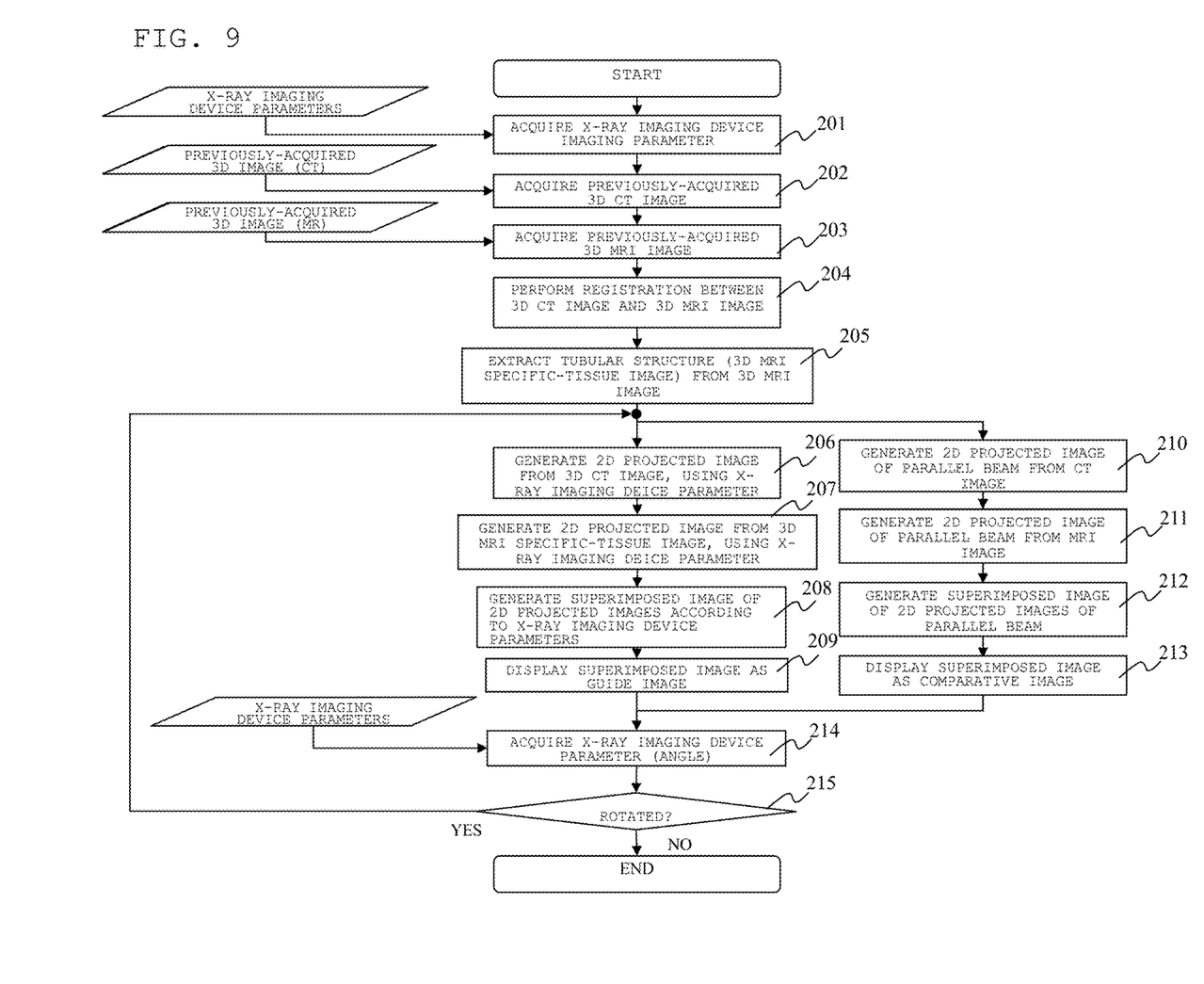
FIG. 9 is a flowchart showing the operation of the medical image processing system according to a third embodiment.

With reference to the flowchart of FIG. 9, the medical image processing system according to the third embodiment will be described.

The medical image processing system of the third embodiment has the same configuration as the medical image processing system 1 of the first embodiment. As shown in FIG. 9, the operation of the medical image processing system according to the third embodiment includes steps 201 to 213 that are the same as the first embodiment shown in the flowchart of FIG. 2, but the third embodiment is different from the first embodiment in the following; after steps 209 and 213, the X-ray imaging device parameter acquisition unit 10 performs step 214 to acquire the angle of the X-ray source with respect to the subject, from the X-ray imaging device 2 or from the X-ray imaging device imaging parameter database.

In step 214, after the X-ray imaging device parameter acquisition unit 10 acquires the angle of the X-ray source with respect to the subject, the process proceeds to step 215, and the projection calculation unit 32 determines whether or not the X-ray source is rotated from a predetermined initial angle (for the second and subsequent times, the angle at the time of executing the previous step 214), and when it is rotated, the process returns to steps 206 and 210.

In steps 206 and 207, the direction of light passage of the cone beam is rotated to be set to the angle obtained in step 214, and the two-dimensional projected images are generated respectively of the three-dimensional CT image and of the three-dimensional MRI specific-tissue image. In steps 208 and 209, a superimposed image (guide image) of the two-dimensional projected images is generated and displayed.

In steps 210 and 211, the direction of light passage of the parallel beam is rotated and set to the angle obtained in step 214, to generate the two-dimensional projected images respectively of the three-dimensional CT image and of the three-dimensional MRI specific-tissue image. In steps 212 and 213, a superimposed image (comparative image) of the two-dimensional projected images is generated and displayed.

Again in step 214, the X-ray imaging device parameter acquisition unit 10 acquires the angle of the X-ray source with respect to the subject, and in step 215, when the angle of the X-ray source is rotated from the angle at the time of executing the previous step 214, the process returns to steps 206 and 210, and steps 206 to 213 are repeated.

As described above, in the third embodiment, even when the angle of the X-ray source of the X-ray imaging device with respect to the subject is rotated during the procedure, the guide image projected by the cone beam and the comparative image projected by the parallel beam at the angle corresponding to the rotated angle can be displayed in real time.

Other configurations, operations, and effects of the medical image processing system according to the third embodiment are the same as those of the first embodiment, and thus descriptions thereof will be not be given here.

What is claimed is:

1. A medical image processing system that generates a subject image serving as a guide image for a procedure performed on a subject while viewing a fluoroscopic image taken by an X-ray imaging device, comprising
   a three-dimensional image acquisition unit configured to receive a three-dimensional CT image of the subject taken in advance by a CT device, and a three-dimensional MRI image of the subject taken in advance by a magnetic resonance imaging device,
   an image registration unit configured to perform registration between the three-dimensional CT image and the three-dimensional MRI image,
   a tissue structure extraction unit configured to generate a three-dimensional MRI specific-tissue image by extracting a predetermined specific tissue image from the three-dimensional MRI image after the registration,
   a parameter acquisition unit configured to acquire a value of predetermined type of parameter among multiple types of parameters set in the X-ray imaging device upon taking the fluoroscopic image,
   a projection calculation unit configured to use the value of the parameter acquired by the parameter acquisition unit to set a direction of light passage corresponding to a direction in which the X-ray passes through the subject in the X-ray imaging device, on each of the three-dimensional CT image and the three-dimensional MRI specific-tissue image, and to project the three-dimensional CT image and the three-dimensional MRI specific-tissue image along the direction of light passage, respectively, to generate two-dimensional projected images, and
   an image superimposition unit configured to generate a superimposed image in which the two-dimensional projected image of the three-dimensional CT image and the two-dimensional projected image of the three-dimensional MRI specific-tissue image are superimposed, and to display the generated superimposed image as the guide image.

2. The medical image processing system according to claim 1, wherein
   the direction of light passage corresponds to the direction of a cone beam.

3. The medical image processing system according to claim 2, wherein
   the image superimposition unit superimposes a radial pattern representing the direction of light passage of the cone beam, on the superimposed image.

4. The medical image processing system according to claim 1, wherein
   the predetermined type of parameter includes a distance between an X-ray source and an X-ray detection panel and a size of the X-ray detection panel when the X-ray imaging device takes the fluoroscopic image.

5. The medical image processing system according to claim 4, wherein
   the parameter acquisition unit acquires the value of the parameter from the X-ray imaging device in which the parameter is set.

6. The medical image processing system according to claim 4, wherein
   the parameter acquisition unit acquires the value of the parameter from a database in which imaging parameters of the X-ray imaging device are stored in advance.

7. The medical image processing system according to claim 1, wherein
   the superimposition unit displays the guide image side by side with the fluoroscopic image.

8. The medical image processing system according to claim 1, wherein
   the parameter acquisition unit acquires as the parameter, an angle of the X-ray source of the X-ray imaging device with respect to the subject, and
   when the angle of the X-ray source acquired by the parameter acquisition unit is rotated from a predetermined angle, the projection calculation unit rotates the direction of light passage to the acquired angle and generates the two-dimensional projected images.

9. A medical image processing method that generates a subject image serving as a guide image for a procedure performed on a subject while viewing a fluoroscopic image taken by an X-ray imaging device, comprising
   acquiring a value of predetermined type of parameter among multiple types of parameters set in the X-ray imaging device upon taking the fluoroscopic image,
   receiving a three-dimensional CT image of the subject taken in advance by a CT device, and a three-dimensional MRI image of the subject taken in advance by a magnetic resonance imaging device,
   performing registration between the three-dimensional CT image and the three-dimensional MRI image,
   generating a three-dimensional MRI specific-tissue image by extracting a predetermined specific tissue image from the three-dimensional MRI image after the registration,
   using the value of the parameter acquired by the parameter acquisition unit to set a direction of light passage corresponding to a direction in which the X-ray passes through the subject in the X-ray imaging device, on each of the three-dimensional CT image and the three-dimensional MRI specific-tissue image, and projecting the three-dimensional CT image and the three-dimensional MRI specific-tissue image along the direction of light passage, respectively, to generate two-dimensional projected images, and generating a superimposed image in which the two-dimensional projected image of the three-dimensional CT image and the two-dimensional projected image of the three-dimensional MRI specific-tissue image are superimposed, and displaying the generated superimposed image as the guide image.

* * * * *